United States Patent [19]

Sakai et al.

[11] Patent Number: 5,070,663

[45] Date of Patent: Dec. 10, 1991

[54] DAMPING DEVICE FOR TOWER-LIKE STRUCTURE

[75] Inventors: Fujikazu Sakai, Tokyo; Shingo Takaeda; Toshihiro Tamaki, both of Chiba, all of Japan

[73] Assignee: Kawasaki Jukogyo Kabushiki Kaisha, Kobe, Japan

[21] Appl. No.: 401,894

[22] Filed: Aug. 30, 1989

[30] Foreign Application Priority Data

Sep. 8, 1988 [JP] Japan .............................. 63-223498
Apr. 20, 1989 [JP] Japan .............................. 1-98694
Jul. 7, 1989 [JP] Japan .............................. 1-174273

[51] Int. Cl.⁵ .............................................. E02D 27/34
[52] U.S. Cl. .............................................. 52/167 R
[58] Field of Search ............... 52/167, 168, 167 DF; 114/125

[56] References Cited

U.S. PATENT DOCUMENTS

| | | | |
|---|---|---|---|
| 3,606,851 | 5/1969 | Pangalila | 114/125 |
| 3,621,804 | 10/1969 | Pangalila | 114/125 |
| 3,678,877 | 7/1972 | Csupor | 114/125 |
| 4,875,313 | 10/1989 | Sato | 52/167 DF |
| 4,894,965 | 1/1990 | Sato | 52/167 DF |
| 4,922,671 | 5/1990 | Sato | 52/167 DF |
| 4,924,639 | 5/1990 | Sato et al. | 52/168 |

FOREIGN PATENT DOCUMENTS 1359428  12/1987  U.S.S.R. ................ 52/167 DF

Primary Examiner—David A. Scherbel
Assistant Examiner—Michele A. Van Patten
Attorney, Agent, or Firm—Schwartz & Weinrieb

[57] ABSTRACT

A damping device for a tower-like structure, includes a liquid column tube having an arbitrary shape and a pair of opposite upstanding end portions thereof where liquid levels are formed, and an orifice provided at an intermediate portion within the liquid column tube, the liquid column tube being mounted upon the tower-like structure. The damping property of the damping device can be quantitatively defined by employing the orifice. Furthermore, as the intermediate portion of the liquid column tube defined between the opposite upstanding end portions can be appropriately configured, the installation space for the damping device is optimized.

24 Claims, 11 Drawing Sheets 5,070,663

DAMPING DEVICE FOR TOWER-LIKE STRUCTURE

FIELD OF THE INVENTION

The present invention relates to a damping device for suppressing vibration of a tower-like structure due to the wind or earthquake.

BACKGROUND OF THE INVENTION

Recently, in connection with techniques for suppressing vibrations of a tower-like structure such as, for example, a high-rise building or a tower of a suspension bridge or a cable-stayed bridge due to the wind or an earthquake, there has been proposed various damping devices based upon the principle of a dynamic vibration damper.

Generally, the principle of the dynamic vibration damper is to absorb the vibrational energy of the structure by providing a natural frequency tuned to a natural frequency of the structure and also by providing a suitable damping mechanism. The principle has been realized in various forms.

A typical form employs the combination of a mass, a spring and a damper. However, such a dynamic damper has the following problems:

(1) It is hard to adjust the natural frequency.

(2) Maintenance is required for aged deterioration of the spring, the damper or the like.

(3) The structural composition and the mechanism are complicated.

(4) Space for accommodating the damping device is limited.

Recently, as one means for solving the above problems, there has been proposed in Japanese Patent Laid-open Publication Nos. 62-101764, 62-292943 and 63-172092 a dynamic vibration damper which utilizes a liquid free surface wave motion (sloshing) within a liquid-filled tank. In accordance with this dynamic vibration damper, the natural frequency of the sloshing is tuned to that of the structure, and the damping mechanism is formed by disposing a porous member or the like within the liquid as an obstacle against the motion of the liquid. However, such a dynamic vibration damper likewise has the following problems:

(1) The sloshing action in response to the vibration having a large amplitude is very complex, and it is therefore hard to calculate the damping effect from the natural frequency and the damping properties.

(2) The damping properties of the porous member or the like is indefinite, and the calculation thereof is difficult.

(3) The space for installing the damping device is limited due to the size or the like of the liquid-filled tank.

OBJECT OF THE INVENTION

It is an object of the present invention to provide a damping device which may precisely exhibit the desired damping function and which may increase the degrees of freedom by means of which the damping device may be installed within the mounting space defined within the structure.

SUMMARY OF THE INVENTION

According to the present invention, there is provided a damping device for a tower-like structure, comprising a liquid column tube having an arbitrary shape and a pair of opposite upstanding end portions thereof where liquid levels are formed, and an orifice provided at an intermediate portion of the liquid column tube, the liquid column tube being mounted upon the tower-like structure.

When the tower-like structure is vibrated, the liquid within the liquid column tube is oscillated in the longitudinal direction of the tube so as to cause vertical vibration of the liquid levels. At this time, the oscillation of the liquid is suitably damped by means of the orifice so as to thereby suppress the vibration of the structure. As the motion of the liquid is one-dimensional, the damping factor can be easily controlled.

BRIEF DESCRIPTION OF THE DRAWINGS

Other objects and features of the invention will be more fully understood from the following detailed description and appended claims when taken in conjunction with the accompanied drawings, in which like reference characters designate like or corresponding parts throughout the several views, and wherein:

FIG. 7b is a top plan view of FIG. 7a;

FIG. 8 is an elevational view of another preferred embodiment of the damping device as modified from FIGS. 7a and 7b and as applied to a spherical structure similar to that of FIG. 7a;

FIG. 12b is a lateral sectional view of the orifice of FIG. 12a;

FIG. 13b is a lateral sectional view of the orifice of FIG. 13a;

DETAILED DESCRIPTION OF THE PREFERRED EMBODIMENTS

There will now be described some preferred embodiments of the present invention with reference to the drawings.

Figure 1:
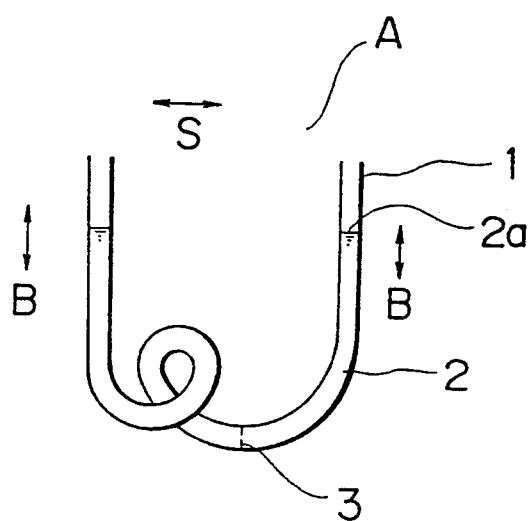
FIG. 1 is a schematic illustration of the damping device according to the present invention.

Referring to FIG. 1 which shows a preferred embodiment of the present invention, reference numeral A designates a damping device for a tower-like structure (not shown), which will be hereinafter referred to as a structure. The damping device A is comprised of a liquid column tube 1 to be located at a position of the structure where displacement due to vibrations are large, a liquid 2 contained within the liquid column tube 1, and an orifice 3 fixedly provided within the liquid column tube 1. A pair of liquid levels 2a of the liquid 2 are present at opposite upstanding end portions of the liquid column tube 1. The cross sectional shape of the liquid column tube 1 may be optional such as, for example circular or rectangular (square, oblong, or the like). Furthermore, the liquid column tube 1 may be optionally curved in the longitudinal direction thereof.

When the structure is vibrated in either one of the directions designated by means of the double-headed arrow S shown in FIG. 1, the liquid levels 2a are oscillated in the vertical directions of the double-headed arrows B. While the vertical motion of the liquid is damped by means of the damping ability of the liquid 2 itself, it is primarily damped by means of the orifice 3.

Vibrational energy of the structure is absorbed by means of the oscillating motion of the liquid 2 within the liquid column tube 1 so as to damp the vibration of the structure. Suitable setting of the damping factor of the orifice contributes to enhanced efficiency of absorption of the vibrational energy. A plurality of orifices 3 may be provided.

Such a damping device will be hereinafter referred to as TLCD (Tuned Liquid Column Damper).

Letting S and B denote the displacements of the structure and the liquid levels 2a, respectively, an equation of motion of the liquid 2 within the liquid column tube constituting the damping device is expressed as follows:

$$\rho AL\ddot{B} + (\tfrac{1}{2})\rho AK|\dot{B}|\dot{B} + 2\rho Ag B = -\rho AC\ddot{S}$$

where $\rho$ is the density of the liquid; g is the gravitational acceleration; A is the sectional area of the liquid column tube 1; L is the length between both liquid levels 2a along the liquid column tube 1; C is the horizontal distance between both liquid levels 2a; and K is a coefficient (pressure loss coefficient) depending upon the opening ratio of the orifice 3. Furthermore, $\dot{B}$ is the first derivative of B with respect to time, and $\ddot{B}$ and $\ddot{S}$ are the second derivatives of B and S with respect to time, respectively.

In the above equation, the right-hand side of the equation represents a term for vibrating the liquid 2 which term can also function as a reaction for suppressing the vibration of the tower-like structure. The first and third terms on the left-hand side of the equation represent a mass effect and a spring effect, respectively. From both terms, a natural period T of the vibration of the liquid column can be obtained as follows:

$$T = 2\pi\sqrt{L/2g}$$

The second term on the left-hand side of the equation represents a damping property of the vibrating of the liquid 2 as determined by means of the orifice 3 provided within the liquid column tube 1. The damping property plays an important role in connection with the damping operation for the vibration of the structure. That is, in order to exhibit a sufficient damping effect by means of the vibration of the liquid column and thereby dampen the vibration of the structure, the damping property must be quantitatively defined at an optimum value. In the prior art damping device including a porous member of the like, the damping property could not be easily quantitatively defined. To the contrary, in view of the fact that the damping device of the present invention employs an orifice, and the pressure loss coefficient K is given as a known constant, the quantitative definition of the damping property can be easily and reliably determined. Thus, according to the present invention, the calculation of the damping effect and the design of the TLCD can be easily and reliably achieved by providing the orifice within the liquid column tube.

Figure 2:
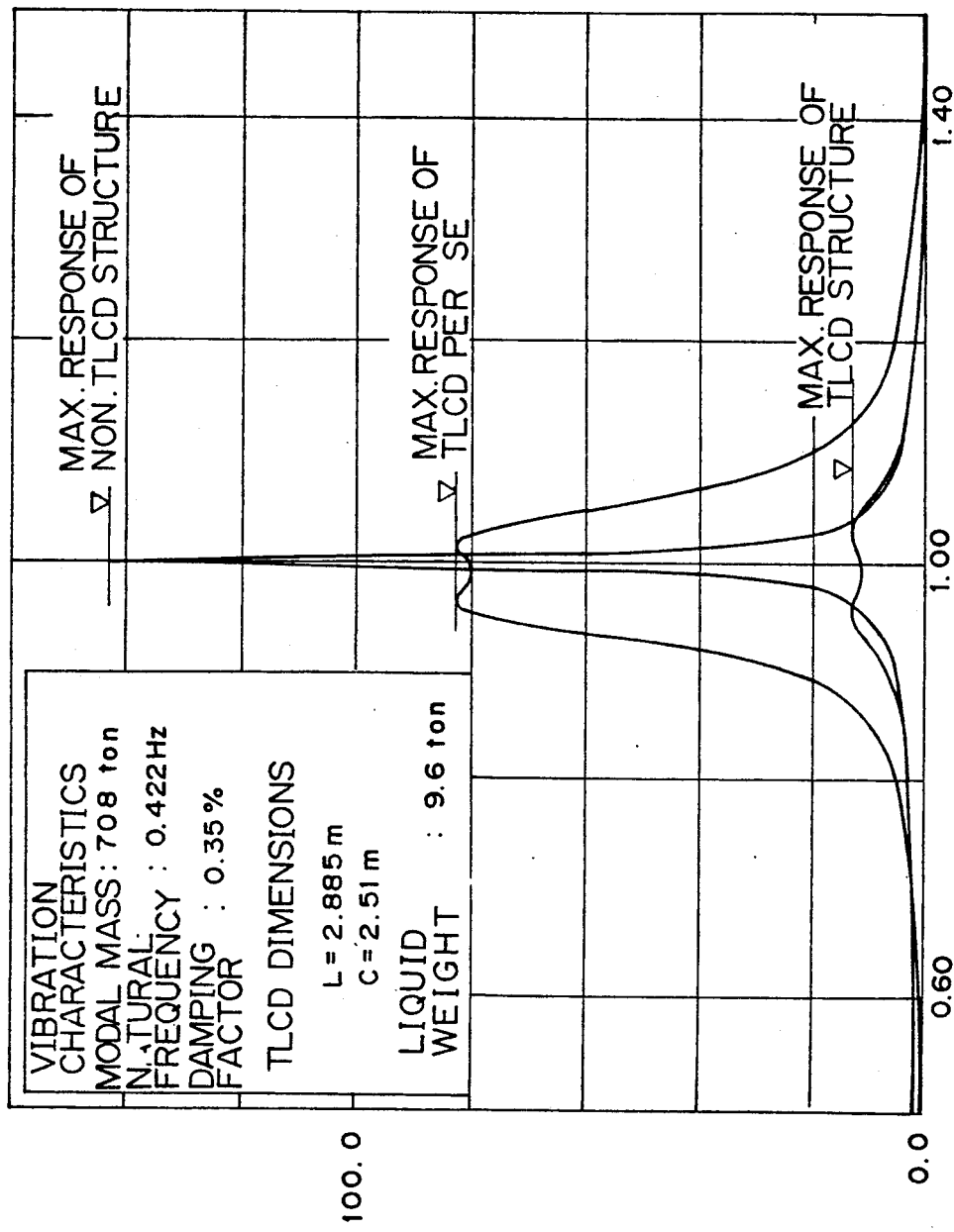
FIG. 2 is a graph showing the relationship between the response magnification of the tower-like structure and the input to natural frequency ratio.

FIG. 2 illustrates an example of the calculation of a response curve which indicates that the vibration of the tower-like structure can be damped by means of the provision of the TLCD. In this graph, the ordinate axis denotes the response magnification of the tower-like structure, while the abscissa axis denotes an input to natural frequency ratio which is defined by means of the relationship frequency of an external force)/(natural frequency of the tower-like structure).

In this manner, the equation of motion can be simply an reliably quantitatively defined. Therefore, the TLCD serving as the damping device can be simply designed as shown by charts in the following manner.

A simple designing method for the TLCD will now be described. The natural period T of the vibration of the liquid column tube is obtained as mentioned above. On the other hand, the natural frequency of the structure can be obtained according to data used in designing the structure. Accordingly, the length L is decided in such a manner that the ratio between the natural frequency of the structure and the natural frequency of the TLCD or the liquid column tube, that is, the tuning ratio is approximately to 1.

Figure 3:
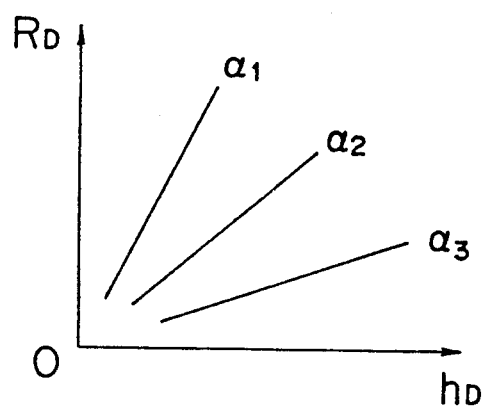
FIG. 3 is a graph showing the relationship between the response value $R_D$ of the liquid column and the damping factor $h_D$ of the damping device as a function of orifice size.

FIG. 3 is a graph showing the relationship between a response value $R_D$ (shown by means of the ordinate axis) indicative of a displacement of the liquid column due to the vibration of the structure and a damping factor $h_D$ of the damping device (shown by means of the abscissa axis). The relationship varies with a change in the opening ratio $\alpha$ of the orifice. As shown in the graph, the opening ratio $\alpha_1$ is larger than the opening ratio $\alpha_2$, and the opening ratio $\alpha_2$ is larger than the opening ratio $\alpha_3$. As is apparent from the graph, $R_D$ is substantially proportional to $h_D$, and the smaller the opening ratio $\alpha$, the smaller the gradient of the straight line (which is inclined with respect to the abscissa axis), that is, the larger the damping factor.

Figure 4A:
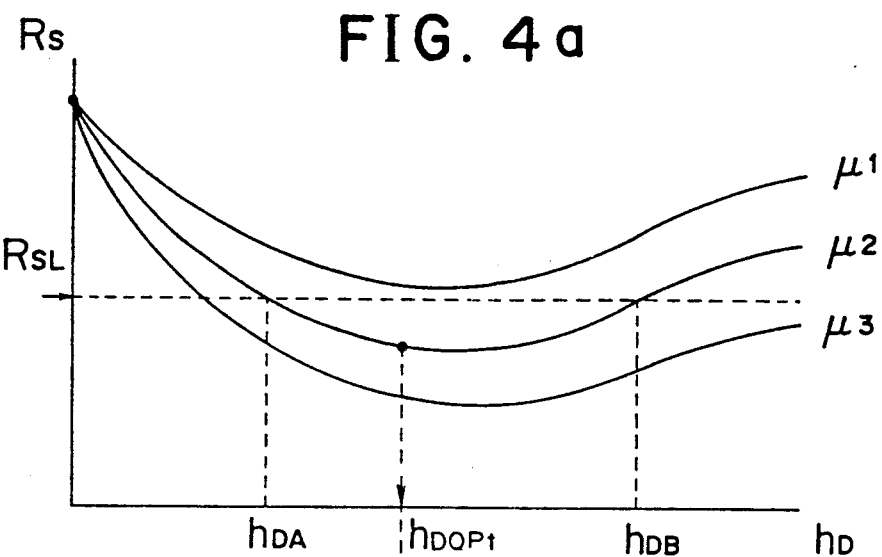
FIG. 4a is a graph showing the relationship between the response value $R_S$ of the structure and the damping factor $h_D$ of the damping device as a function of the ratio of the effective mass of the damping device with respect to the mass of the structure.

FIG. 4a is a graph showing the relationship between a response value $R_S$ of the structure and the damping factor $h_D$ of the damping device. In this graph, $\mu$ ($\mu_1 < \mu_2 < \mu_3$) represents the ratio of (effective mass of the damping device)/(generalized mass of the structure). As is apparent from the graph, the response value $R_S$ decreases with an increase in the damping factor $h_D$ up to a predetermined value, and increases with a further increase in the damping factor $h_D$ from the predetermined value. $R_{SL}$ designates a permissible limit of the amplitude of the structure, and a dotted line extending along the permissible limit $R_{SL}$ and extending parallel to the abscissa axes intersects some of the curved lines. According to the value of $\mu$ in this case, the effective mass of the damping device, that is, the size of the damping device can be determined. In the case of $\mu = \mu_2$, the dotted line intersects the curved line of $\mu_2$ at two points $h_{DA}$ and $h_{DB}$. Accordingly, if the damping factor $h_D$ falls within the range defined between $h_{DA}$ and $h_{DB}$, the value of the response structure must not be greater than the permissible limit $R_{SL}$. An optimum value of the damping factor $h_D$ is represented by means of the value $h_{Dopt}$ present at an intermediate point between $h_{DA}$ and $h_{DB}$.

Figure 4B:
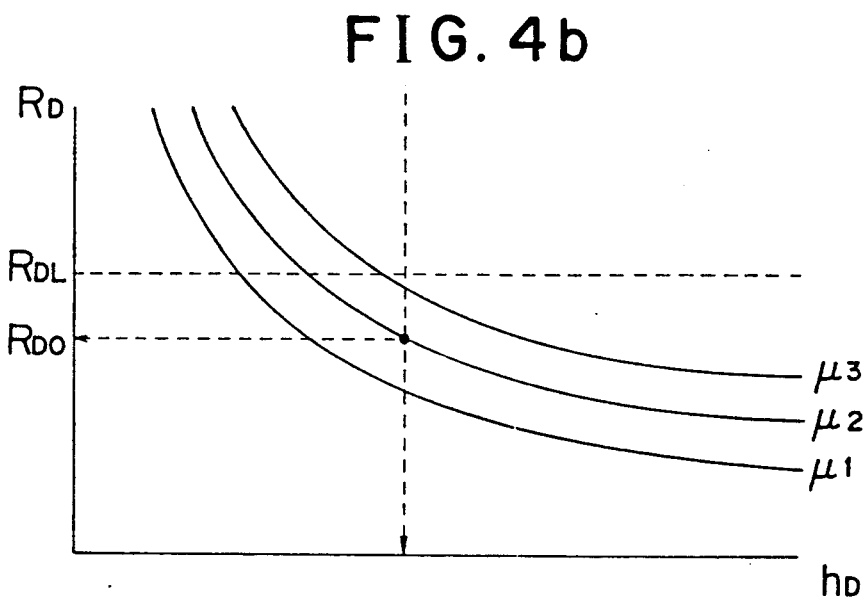
FIG. 4b is a graph showing the relationship between the response value $R_D$ of the damping device and the damping factor $h_D$ of the damping device as a function of the ratio of the effective mass of the damping device with respect to the mass of the structure.

FIG. 4b is a graph showing the relationship between the response value $R_D$ (shown by the ordinate axis) of the damping device due to the vibration and the damping factor $h_D$ (shown by means of the abscissa axis) of the damping device. As is apparent from the graph, the relationship varies with a change in the value of $\mu$. It is appreciated that the larger the damping factor $h_D$, the smaller the response value $R_D$, and that the smaller the damping factor $h_D$, the larger the response value $R_D$. $R_{DL}$ designates a permissible limit for the response value of the liquid column, and it depends upon the movable range of the liquid levels $2a$ which range also depends upon the clearance of the damping device. $R_{DO}$ designates the response value of the liquid column at the optimum damping factor $h_{Dopt}$ in the case of $\mu_2$, and it is set so as to be smaller than the permissible limit $R_{DL}$.

Figure 4C:
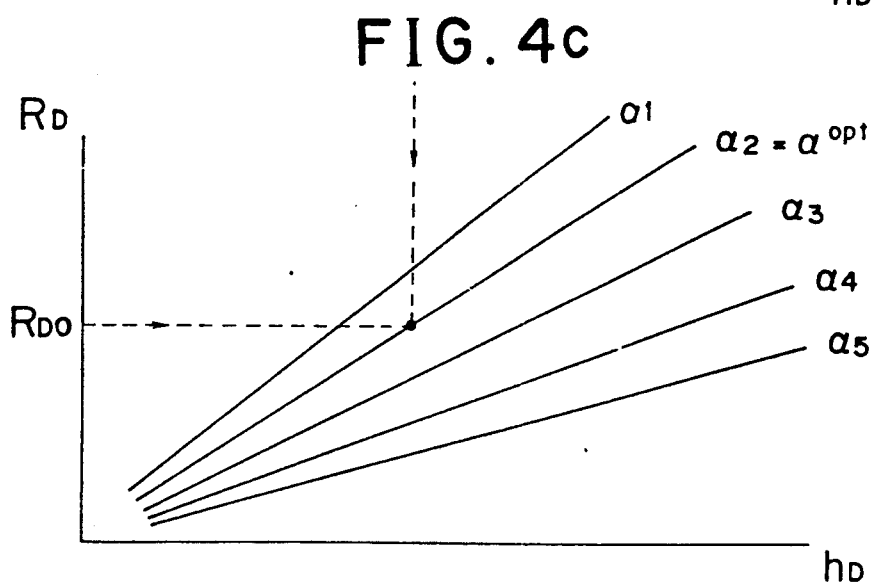
FIG. 4c is a graph showing the relationship between the response value $R_D$ of the damping device and the damping factor $h_D$ of the damping device as a function of the opening ratio or size of the orifice.

FIG. 4c is a graph showing the relationship between the response value $R_D$ (shown by means of the ordinate axis) of the damping device due to the vibration and the damping factor $h_D$ (shown by means of the abscissa axis) of the damping device, wherein the damping factor $h_D$ varies with a change in the opening ratio $\alpha$ of the orifice. It is appreciated that the intersection between a horizontal dotted line corresponding to the optimum response value $R_{DO}$ and a vertical dotted line corresponding to the optimum damping factor $h_{Dopt}$ obtained in FIG. 4a lies upon the straight line $\alpha_2$.

Thus, the optimum damping factor $h_{Dopt}$ and the other characteristic values of the damping device are determined.

Each of the graphs shown in FIGS. 3 and 4 can be obtained by means of calculations regarding the liquid column tube and the orifice, and they are clearly quantitatively defined. In the prior art damping device utilizing sloshing, such a quantitative definition of the damping factor was difficult to obtain because of the complexity of the sloshing motion and the damping property by means of the porous member. According to the present invention, the quantitative definition of the damping factor can be easily carried out by utilizing the orifice within the liquid column tube so as to improve the performance of the damping device and render the manufacture thereof easy.

Figure 5:
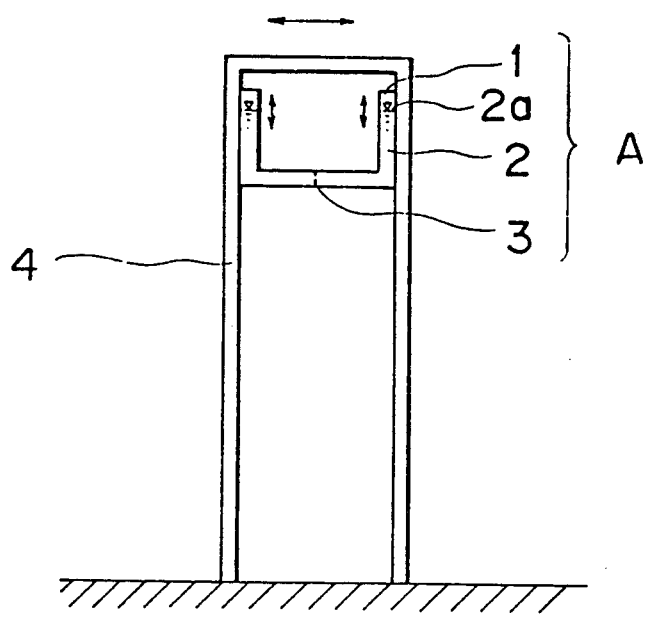
FIG. 5 is a schematic illustration of the damping device as applied to a structure according to the present invention.

FIG. 5 is a schematic side elevation of a preferred embodiment of the present invention in the case of a primary vibration mode, wherein the damping device A is normally located within the vicinity of the top of a tower-like structure 4 where the greatest effect can be exhibited. On the other hand, in the case of a secondary vibration mode, the damping device may be located within the vicinity of an intermediate portion of the structure since the amplitude may become maximized at this location. Particularly in the case that the structure is a tower of a suspension bridge having a base at its lower end which is fixed at its upper end by means of wires, the damping device is located at the intermediate portion of the tower where the displacement amplitude becomes a maximum.

Figure 6:
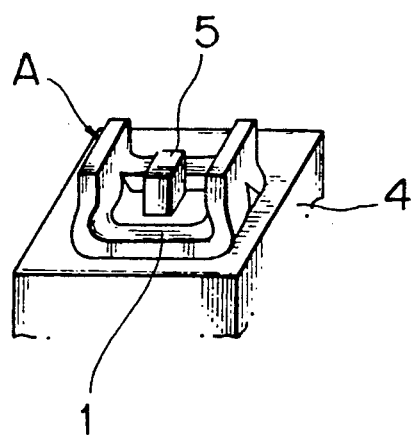
FIG. 6 is a perspective view of the damping device wherein the liquid column tube is bypassed.

FIG. 6 is a perspective view showing the alignment of the liquid column tube 1 in the case that an obstacle 5 is present upon the tower-like structure 4 at a position where the damping device A is to be located. In the prior art, if such an obstacle 5 is present, the damping device could not be located upon the structure because the obstacle 5 is in the way. In other words, it was necessary to assure a space for the exclusive use by means of the damping device. According to the present invention, it is only necessary to provide the liquid column tube 1 with a predetermined length. The shape of the tube 1 except at the opposite ends thereof is configured at the planner's discretion. For example, even when the alignment is bypassed as shown, the natural frequency of the liquid column tube 1 is not affected. Accordingly, it is unnecessary to assure a space for the exclusive use by means of the damping device. Additionally, since water is normally used for the liquid 2, it can also serve various other purposes such as, for example, fire-fighting or the like.

Figure 7A:
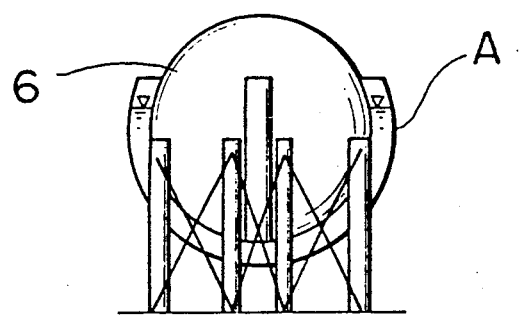
FIG. 7a is an elevational view of a preferred embodiment of the damping device as applied to a spherical structure according to the present invention.
Figure 7B:
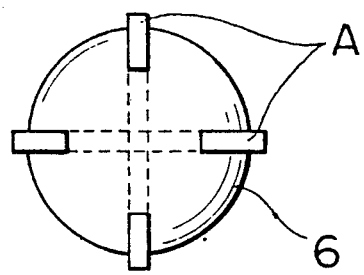

FIGS. 7a and 7b show an embodiment wherein a pair of damping devices A are mounted upon a spherical tower-like structure such as, for example, an elevated tank. The damping devices A of the TLCD are provided so as to extend from the bottom of the tank toward the top thereof and along the peripheral contour in such a manner as to be crossed at right angles with respect to each other as shown in FIG. 7b. In this embodiment, the vibration of the tank in all directions upon the mounting surface of the tank can be damped.

Figure 8:
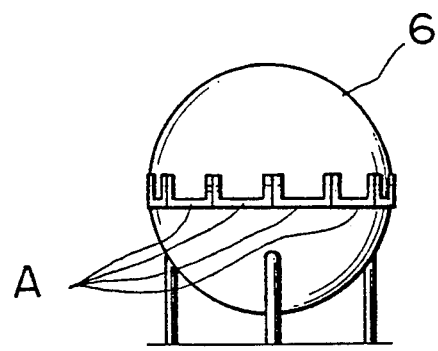

FIG. 8 shows an embodiment wherein a plurality of damping devices A are mounted upon the spherical tank 6. This embodiment is effective in the case that the natural period of the vibration of the overall structure is short as compared with that of the embodiment of FIGS. 7a and 7b.

Figure 9:
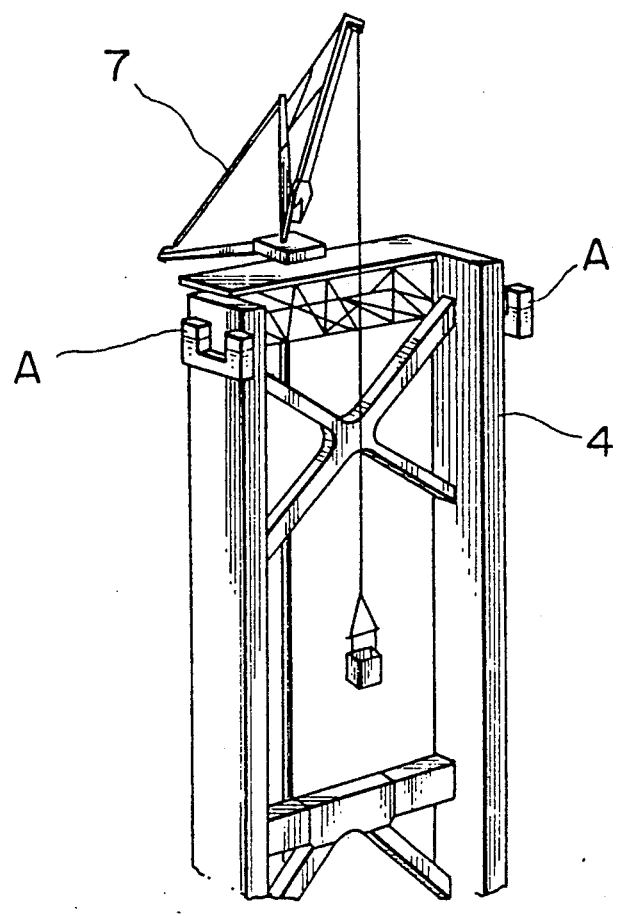
FIG. 9 is a perspective view of a further preferred embodiment of the damping device as applied to a structure under construction.

FIG. 9 shows an embodiment wherein a pair of damping devices A comprising a TLCD are located at positions upon the structure 4 under construction where the vibration tends to occur. Since the tower-like structure 4 suffers vibration due to the wind or an earthquake not only after the completion of construction but also during construction, it is preferable to mount the damping device upon the structure 4 while the same is under construction. Reference numeral 7 designates a crane for constructing the tower-like structure.

Figure 10:
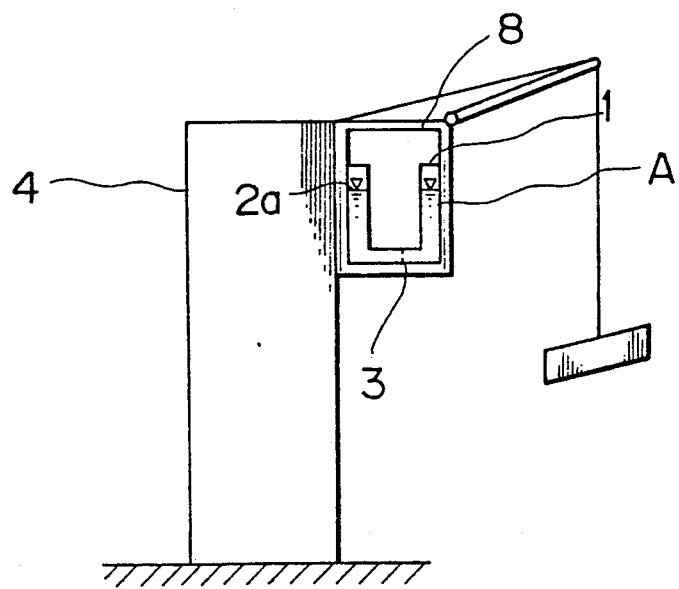
FIG. 10 is an elevational view of a further preferred embodiment of the damping device as applied to a creeper crane.

FIG. 10 shows an embodiment wherein the damping device A is located within a crane 8 for constructing the tower-like structure 4 under construction. In the embodiment shown in FIG. 9, it is necessary to change the position of the damping device in accordance with the increased elevation of the structure 4. To the contrary, in the embodiment shown in FIG. 10, the crane 8 is a creeper crane or a similar crane which can be lifted in accordance with the increased elevation of the tower-like structure 4. Accordingly, the damping device A located within the crane 8 is maintained at the top portion of the tower-like structure 4 at all times until completion of construction. That is, it is unnecessary to independently move the damping device per se.

Figure 11:
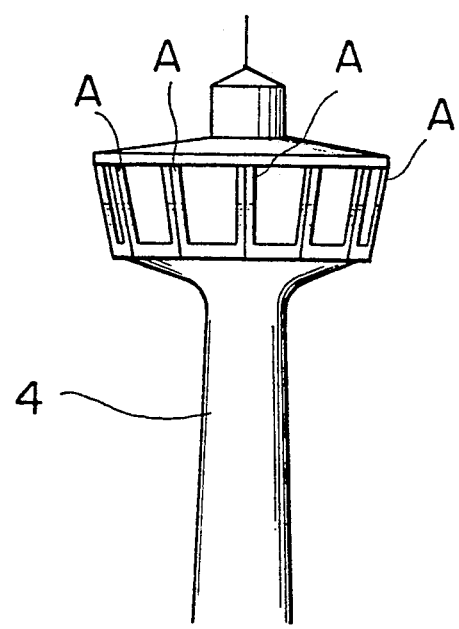
FIG. 11 is an elevational view of a further preferred embodiment of the damping device as applied to an observatory.

FIG. 11 shows an embodiment wherein a plurality of damping devices A are mounted upon an observatory which is another example of the tower-like structure 4. The damping devices A are located upon window frames of the observatory in such a manner as to surround the same and by taking into consideration the natural period of vibration, limited space and esthetics. With this arrangement, the vibration of the observatory in every horizontal direction can be damped.

Figure 12A:
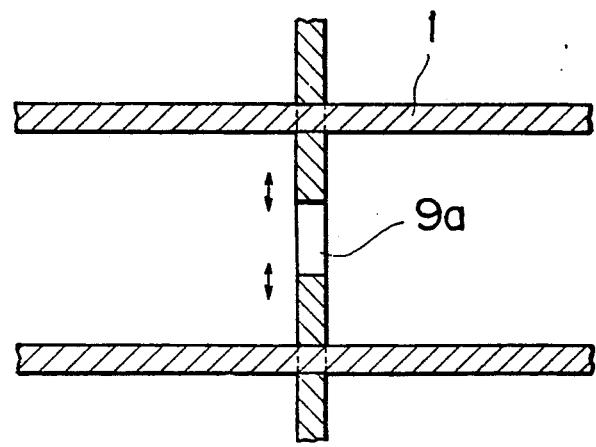
FIG. 12a is a sectional view in elevation of the variable orifice constructed according to the present invention.
Figure 12B:
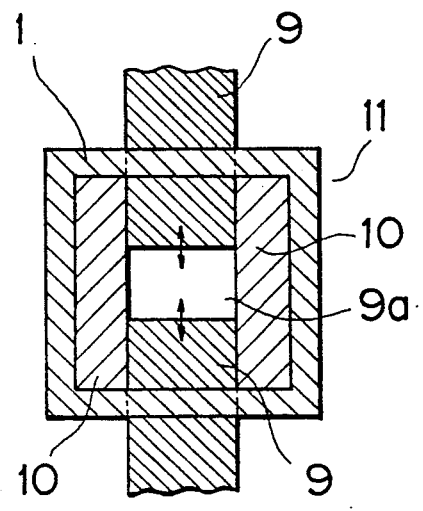

FIGS. 12a and 12b show an embodiment wherein a variable orifice 11 adjustable in its opening ratio is used, with the orifice aperture being shown at 9a. The variable orifice 11 is composed of a pair of fixed members 10 and a pair of movable members 9. The fixed members 10 are fixed on opposite sides within the liquid column tube 1 having a rectangular cross-section. The movable members 9 are slidably engaged between the fixed members 10 in such a manner as to be movable in the directions of the double-headed arrows shown in FIGS. 12a and 12b. The movable members 9 are inserted through the opposite walls of the liquid column tube 1, and are sealed by a known watertight structure. A driving means (not shown) is connected to one or both of the movable members 9, and an operating handle (not shown) is connected to the driving means so as to move one or both of the movable members 9 into and out of the liquid column tube 1. In operation, when the handle is operated so as to move one or both of the movable members 9 in order to change the aperture 9a defined between the movable members 9, the opening ratio of the variable orifice 11 is adjusted to a desired value.

Figure 13A:
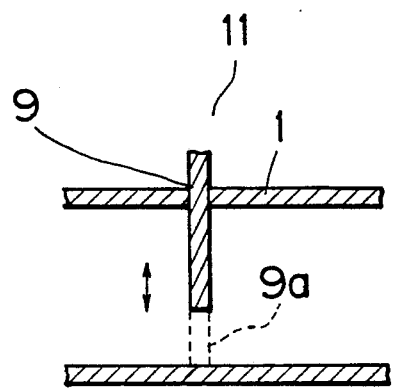
FIG. 13a is a sectional view in elevation of another embodiment of the variable orifice of the present invention.
Figure 13B:
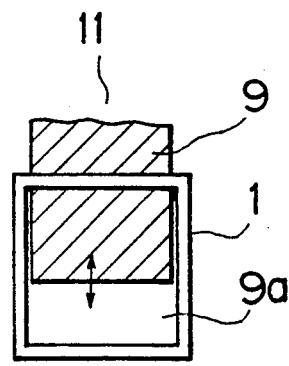

FIGS. 13a and 13b show another embodiment of the variable orifice 11, wherein the fixed member 10 and the lower movable member 9 shown in FIGS. 12a and 12b are omitted. That is, the upper movable member 9 alone is slidably inserted through the wall of the liquid column tube 1.

Figure 14:
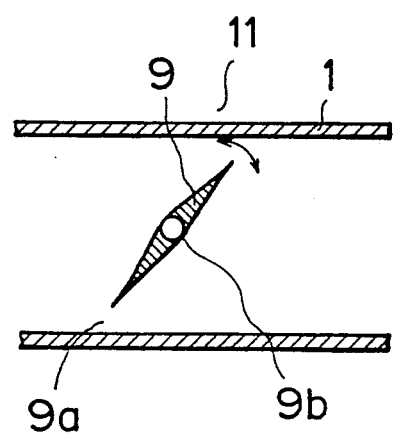
FIGS. 14 and 15 are sectional views of further modifications of the variable orifice of the present invention.

FIG. 14 shows a further embodiment of the variable orifice 11, wherein the movable member 9 is rotatably supported upon a shaft 9b within the liquid column tube 1. The movable member 9 has a size large enough to close the cross-section of the liquid column tube 1.

Figure 15:
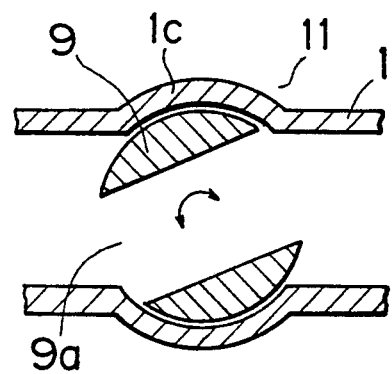

FIG. 15 shows a further embodiment of the variable orifice 11, wherein a pair of movable members 9 each having a segmental cross-section are rotatably provided within the liquid column tube 1 in opposed relationship with respect to each other. The liquid column tube 1 is formed with a pair of arcuate recesses 1c for receiving the segmental movable members 9. The movable members 9 are connected with each other outside the liquid column tube, and are supported upon a rotating shaft (not shown).

Thus, the use of the variable orifice 11 provides an easy change in the damping factor $h_D$ of the damping device. Furthermore, when the amount of the liquid to be charged into the liquid column tube 1 is adjusted so as to change the length L of the liquid column between the opposite liquid levels 2a along the liquid column tube 1 in addition to the change in the damping factor $h_D$, the characteristics of the damping device can easily follow any change in conditions of the structure such as, for example, a change in the natural frequency even in the case that the damping device is applied to the structure under construction.

Figure 16A:
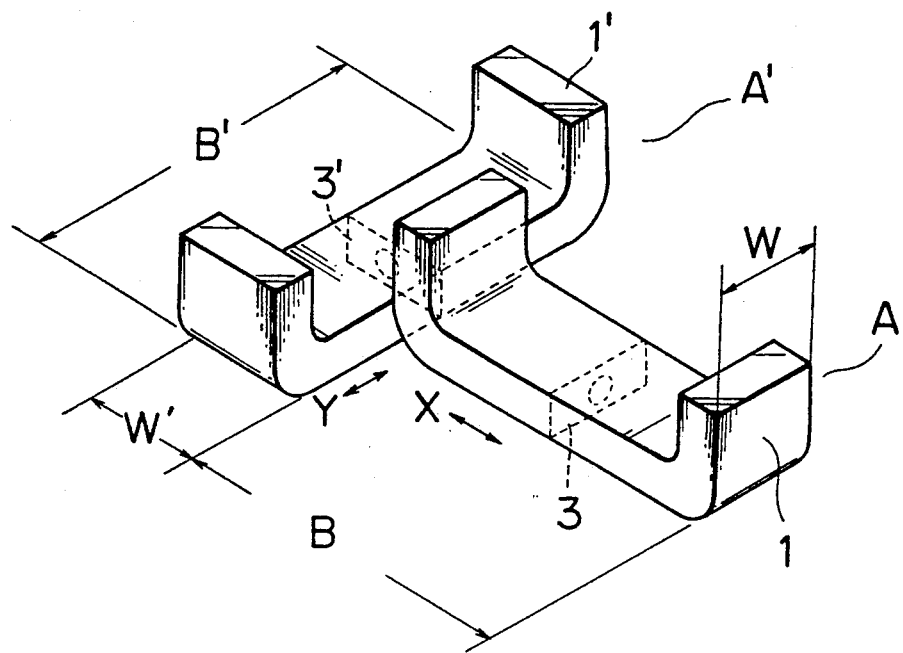
FIG. 16a is a perspective view of two combined liquid column tubes arranged in a T-shaped configuration.
Figure 16B:
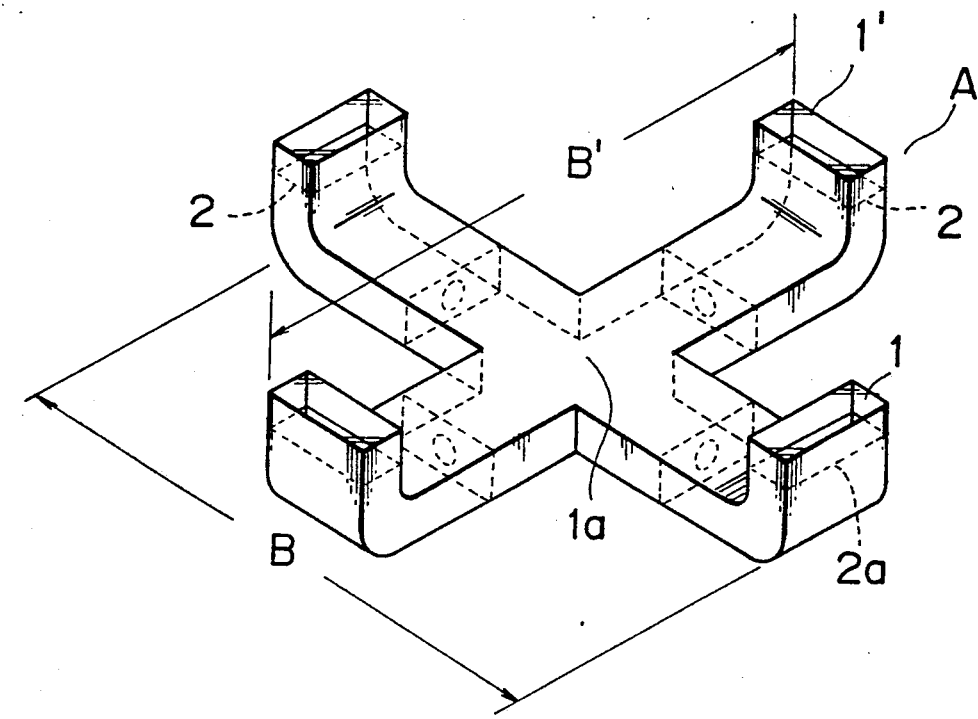
FIG. 16b is a perspective view of two combined liquid column tubes arranged in a crossed configuration.

FIGS. 16a and 16b show different embodiments wherein two liquid column tubes 1 and 1' constituting the damping device of the present invention are combined so as to be arranged in a perpendicular relationship with respect to each other. Such perpendicular arrangement is intended to meet the requirement such that any vibration in two or more directions as well as in one direction will be absorbed. In the embodiment shown in FIG. 16a, the two liquid column tubes 1 and 1' are arranged in a T-shaped configuration. Reference characters B and B' denote distances between the opposite upstanding portions of the liquid column tubes 1 and 1', respectively (which distances will be hereinafter referred to as upstanding distances), and reference characters W and W' denote the widths of the liquid column tubes 1 and 1', respectively. Accordingly, it is necessary to provide an installation space of B'×(B+W'), and it is also necessary to charge the liquid 2 in an amount corresponding to the sum of the volumes of the liquid column tubes 1 and 1'. If the structure is large, not only the lengths of the liquid column tubes 1 and 1' but also the widths thereof become several meters, resulting in enlargement of the installation space and the amount of the liquid required.

In the embodiment shown in FIG. 16b, the two liquid column tubes 1 and 1' are arranged in a crossed configuration so as to form a central intersecting conduit portion 1a as a common conduit portion of both the tubes 1 and 1'. A desired number of the orifices 3 are provided within the liquid column tubes 1 and 1'. In this embodiment, it is necessary to define an installation space of B×B'. Accordingly, the installation space can be reduced as compared with that of the embodiment shown in FIG. 16a. Furthermore, the amount of the liquid 2 can be reduced by the volume of the intersecting conduit portion 1a. The intersecting conduit portion 1a may also be formed at end portions of the liquid column tubes 1 and 1'.

Figure 17:
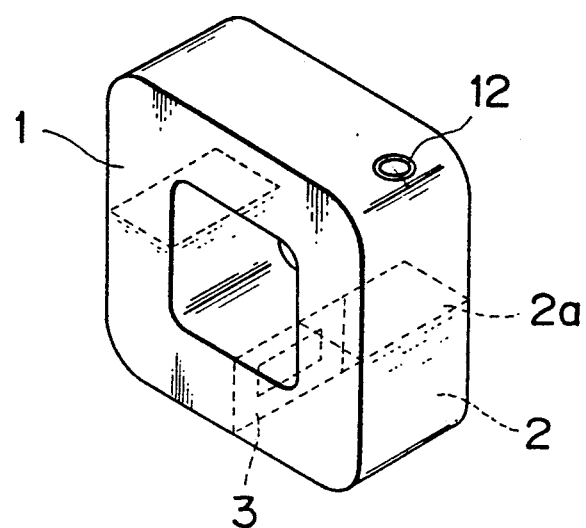
FIG. 17 is a perspective view of a closed-loop liquid column tube constructed according to the present invention.

FIG. 17 shows an embodiment wherein the opposite upstanding portions of the liquid column tube are connected to each other so as to form a closed-loop type liquid column tube 1. The closed liquid column tube 1 is formed with a filler opening to be closed by means of a lid 12 for charging the liquid 2 or an inert gas to be hereinafter described, into the tube 1. In the embodiment shown in FIG. 1, the opposite upstanding portions of the liquid column tube 1 are open at their upper ends. Accordingly, the liquid in the tube 1 vaporizes after a long period of time so as to cause a reduction of the damping effect. Furthermore, if an unexpected vibration having a large amplitude is induced within the liquid column tube 1, the liquid can overflow. Moreover, rust and corrosion tend to be generated upon the inner wall of the liquid column tube 1 in the vicinity of the liquid levels 2a.

To the contrary, the closed liquid column tube 1 as shown in FIG. 17 can prevent the vaporization of the liquid 2 and the overflowing of the liquid 2 upon generation of a large vibrational amplitude. Furthermore, the generation of rust or the like upon the inner wall of the tube 1 within the vicinity of the liquid levels 2a can be prevented by charging an inert gas into the tube 1.

The vibration characteristics of the tower-like structure under construction change with each step of construction. Such a change in the vibration characteristics can be followed to some extent by changing the amount of the liquid within the liquid column tube as mentioned previously. However, there are many cases where the change in the characteristics cannot be compensated for or accommodated merely by changing the amount of liquid within the column tube. In these cases, it is necessary to replace the liquid column tube 1 with a longer or shorter one. Such replacement is troublesome and uneconomical.

Figure 18:
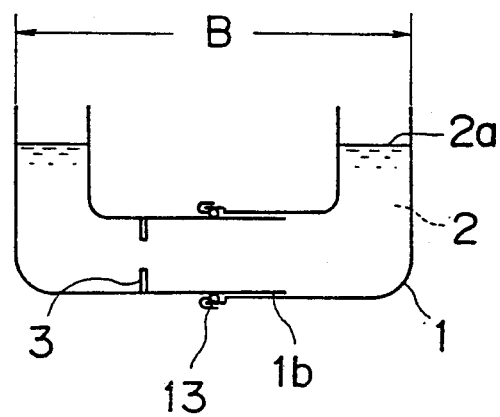
FIG. 18 is an elevational view of a preferred embodiment of the damping device having a liquid column tube which is variable in length.

FIG. 18 shows an embodiment which eliminates the above disadvantages, wherein the length of a horizontal portion of the liquid column tube 1 is adjustable. That is, the horizontal portion is provided with a slidable portion 1b which is sealed in a watertight manner by means of a packing 13. With this arrangement, the distance B defined between external sidewalls of the liquid column tube 1 is changed by sliding the slidable portion 1b, thereby changing the length L defined between the liquid levels 2a along the liquid column tube 1.

Accordingly, the vibration characteristic can be made optimal in accordance with each step of construction by changing the length of the damping device as well as the amount of the liquid within the damping device. Even when the tower-like structure is under construction, the vibration characteristics can be easily changed with the damping function maintained constant.

The liquid to be used with the damping device is normally water. However, if the water is frozen in a cold environment, the damping function cannot be exhibited or achieved. Accordingly, it is necessary to prevent the freezing of the water by continuously supplying heat from a heat source, causing an increase in the maintenance cost of the damping device.

Such a disadvantage can be eliminated by mixing an antifreezing fluid such as, for example, ethylene glycol with the water.

As described above, the following effects can be exhibited according to the damping device of the present invention.

(1) As the orifice has a predetermined definite mechanism which is used, within the liquid column tube, the characteristic values can be easily quantitatively defined so as to thereby obtain a high-performance damping device.

(2) As a change in the natural frequency of the structure in concert with the proceeding of the construction thereof can be followed by changing the length of the liquid column tube and the amount of the liquid to be charged into the liquid column tube, the damping device can be easily adapted to the structure while under construction.

(3) As the shape of an intermediate portion of the liquid column tube can be appropriately selected with the length L of the tube fixed, a degree of freedom with respect to the installation space within the structure can be increased.

(4) As a damper or the like which is susceptible to aging is not used, the maintenance of the damping device is easy.

(5) In the case of using a variable orifice, a change in conditions of the structure can be easily compensated for or accommodated.

(6) By combining two liquid column tubes and intersecting the conduits of the tubes so as to form a common intersecting conduit portion, the installation space for the damping device and the amount of the liquid to be charged into the damping device can be reduced, and the vibration in all directions can be damped by means of the damping device.

(7) By forming the liquid column tube into a closed-loop type configuration, the vaporization of the liquid within the liquid column tube and the generation of rust or the like upon the inner wall of the liquid column tube can be prevented.

(8) By mixing an antifreezing fluid with water as the liquid to be charged into the damping device, the freezing of the water within a cold environment can be prevented without the necessity of the provision of a heat source or the like, thereby facilitating the maintenance work and reducing the operative costs thereof. Obviously, many modifications and variations of the present invention are possible in light of the above teachings. It is therefore to be understood that within the scope of the appended claims, the present invention may be practiced otherwise than as specifically described herein.

What is claimed is:

1. A damping device for damping vibrations induced within a tower-like structure having particular vibrational characteristics, comprising:

a substantially U-shaped liquid column tube, having a pair of opposite upstanding end portions interconnected by means of a horizontally extending intermediate portion, mounted upon said tower-like structure, and containing a liquid therein; and orifice means defined within said horizontally extending intermediate portion, said orifice means comprising a single aperture having a predetermined pressure loss coefficient defined by means of a predetermined opening ratio so as to achieve an optimum damping factor for said tower-like structure such that vibrational energy is efficiently absorbed whereby the motion of said liquid within said liquid column tube, and the vibration of said tower-like structure, are damped when vibrations are induced within said tower-like structure.

2. The damping device as defined in claim 1, wherein said orifice is a variable orifice adjustable in its opening ratio.

3. A damping device as set forth in claim 2, wherein said variable orifice comprises:

a single plate-like member slidably mounted upon said liquid column tube so as to be movable through a first wall portion of said liquid column tube and relative to wall portions of said liquid column tube so as to selectively enlarge and contract the cross-sectional area of said liquid column tube defining said orifice means.

4. A damping device as set forth in claim 2, wherein said variable orifice comprises:

a rotatable valve means rotatably disposed within said liquid column tube.

5. A damping device as set forth in claim 4, wherein said rotatable valve means comprises:
a rotatable plate disposed within said liquid column tube so as to be rotatably movable between a first position at which said plate closes the cross-sectional extent of said liquid column tube, and a second position at which said plate opens said cross-sectional extent of said liquid column tube.

6. A damping device as set forth in claim 4, wherein said rotatable valve means comprises:
a cylinder rotatably disposed within said liquid column tube and having diametrically extending slot means defined through said cylinder such that when said cylinder is disposed at a first position, said slot means is disposed in a cross-sectional direction with respect to said liquid column tube so as to close the cross-sectional extent of said liquid column tube, while when said cylinder is disposed at a second position, said slot means is aligned with a longitudinal axis of said liquid column tube so as to effectively open said cross-sectional extent of said liquid column tube.

7. A damping device as set forth in claim 2, wherein said variable orifice comprises:
a pair of oppositely disposed members fixed within said horizontally extending intermediate portion of said liquid column tube; and
a pair of oppositely disposed members movably mounted upon said horizontally extending intermediate portion of said liquid column tube so as to be movable toward and away from each other in order to variably open or close said orifice.

8. A damping device as set forth in claim 7, wherein:
said liquid column tube has a substantially rectangular cross-sectional configuration; and
said pair of fixed members, and said pair of movable members, are mounted upon opposite sides of said rectangular liquid column tube.

9. A damping device as set forth in claim 1, further comprising:
means for mounting said liquid column tube upon a crane movably mounted upon said tower-like structure.

10. A damping device as set forth in claim 9, wherein:
said crane comprises a creeper crane secured to an external surface of said tower-like structure.

11. A damping device as set forth in claim 1, further comprising:
a second liquid column tube having a substantially U-shaped configuration and interconnected with said substantially U-shaped liquid column tube so as to intersect said substantially U-shaped liquid column tube at respective horizontally extending intermediate portions thereof so as to define a column intersecting horizontally extending intermediate portion; and
a second orifice means, similar to said orifice means, defined within said horizontally extending intermediate portion of said second liquid column tube.

12. A damping device as set forth in claim 11, wherein:
said intersecting horizontally extending intermediate portions of said liquid column tube and said second liquid column tube comprise four sections of said intersecting horizontally extending intermediate portions disposed upon four sides of said common intersecting horizontally extending intermediate portion; and
a pair of orifice means, and a pair of second orifice means, are respectively disposed within said four sections of said intersecting horizontally extending intermediate portions.

13. A damping device as set forth in claim 11, wherein:
said tower-like structure comprises an elevated tank; and
said intersecting liquid column tubes extend about peripheral surface portions of said elevated tank.

14. A damping device as set forth in claim 1, wherein: said tower-like structure comprises a bridge tower.

15. A damping device as set forth in claim 14, wherein:
said opposite upstanding end portions of said damping device are interposed between opposite upstanding frame members of said bridge tower.

16. The damping device as defined in accordance with claim 1, wherein said liquid column tube is formed in a loop-like closed configuration by connecting said opposite upstanding end portions.

17. The damping device as defined in accordance with claim 1, wherein said intermediate portion of said liquid column tube is provided with a watertight sliding portion so as to change the length dimension of said intermediate portion of said liquid column tube.

18. The damping device as defined in accordance with claim 1, wherein an antifreezing fluid is mixed with a liquid in said liquid column tube.

19. A damping device as set forth in claim 18, wherein:
said liquid is water.

20. A damping device as set forth in claim 18, wherein:
said antifreezing fluid comprises ethylene glycol.

21. A damping device as set forth in claim 1, wherein:
said tower-like structure comprises an elevated tank.

22. A damping device as set forth in claim 21, wherein:
a plurality of damping devices are serially disposed in a circumferential manner about said elevated tank.

23. A damping device as set forth in claim 1, wherein:
said tower-like structure comprises an observatory.

24. A damping device as set forth in claim 23, wherein:
a plurality of damping devices are serially disposed in a circumferential manner about window frames of said observatory.

* * * * *